Feb. 13, 1940. C. O. TODD 2,190,578
LAWN MOWER ATTACHMENT
Filed Sept. 26, 1939 2 Sheets-Sheet 1
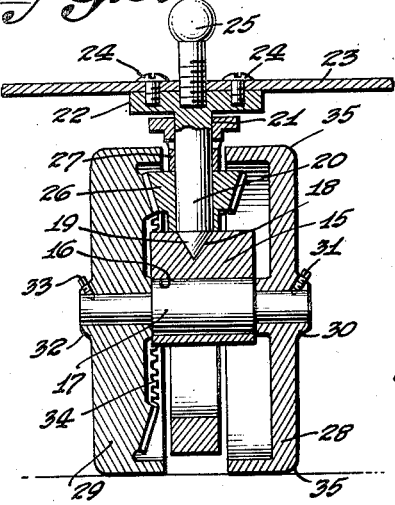
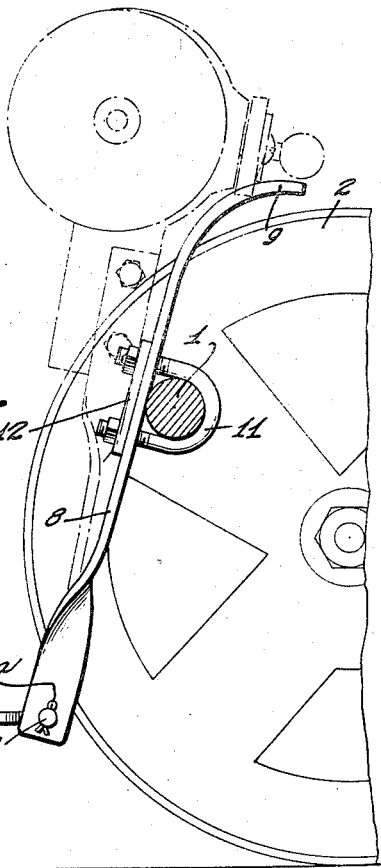
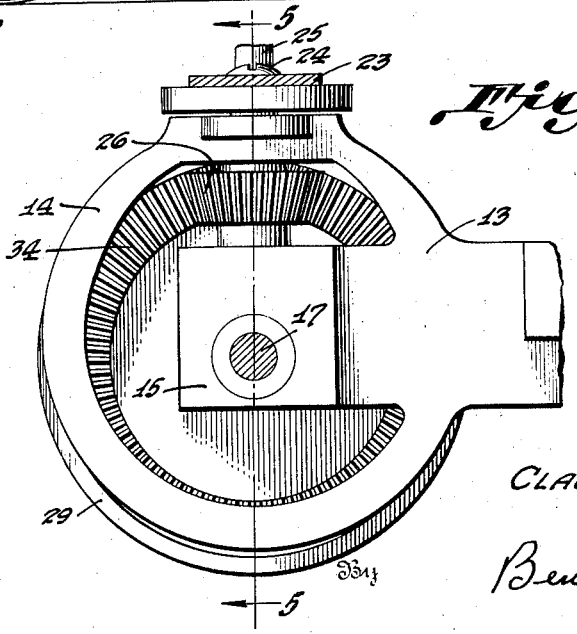
Inventor
CLAUDE O. TODD
Ben Cohen
Attorney

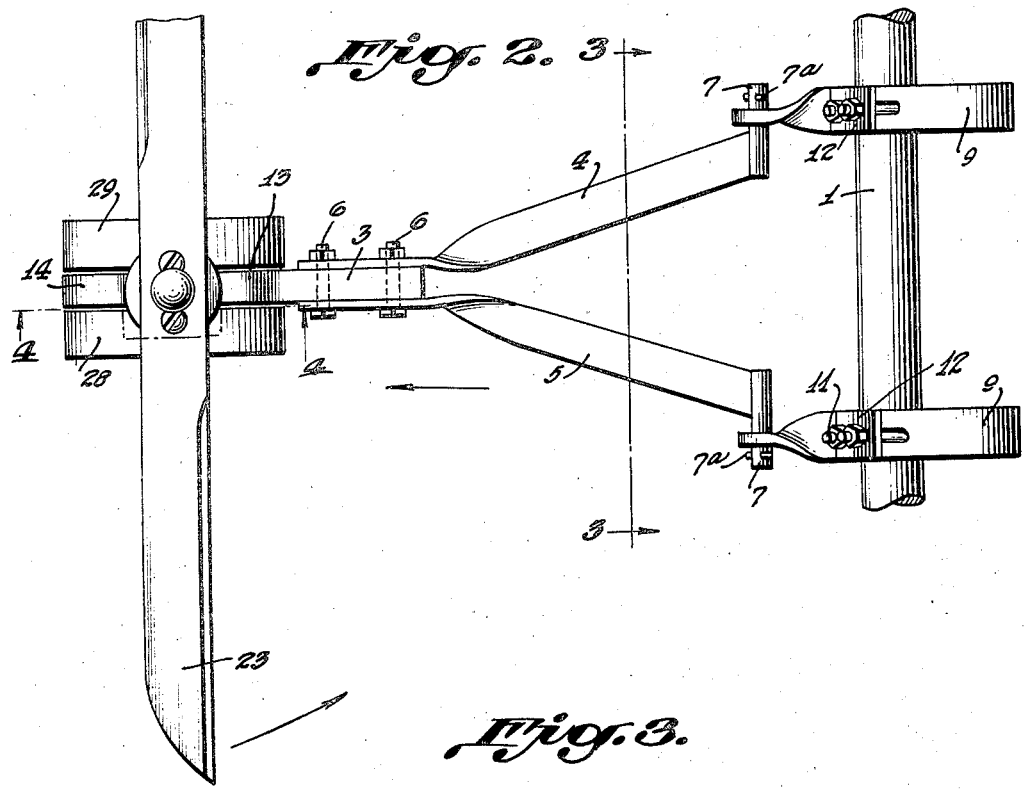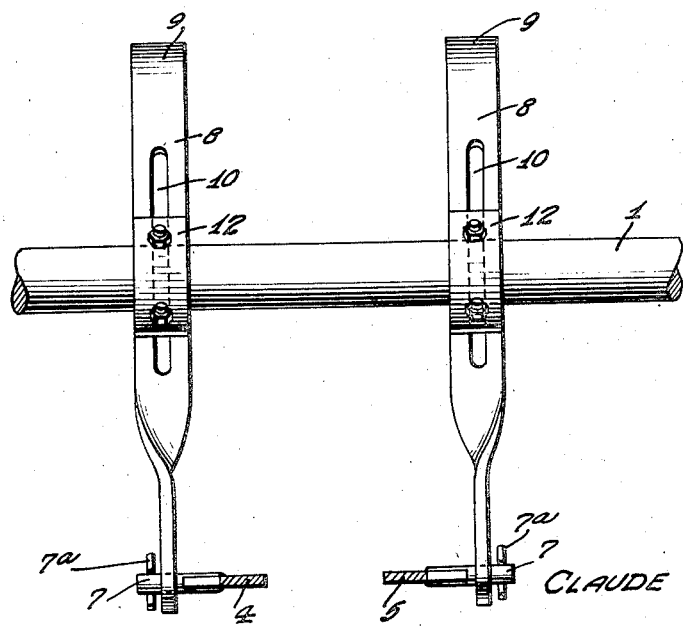

Patented Feb. 13, 1940

2,190,578

UNITED STATES PATENT OFFICE 2,190,578

LAWN MOWER ATTACHMENT

Claude O. Todd, Washington, D. C.

Application September 26, 1939, Serial No. 296,647

6 Claims. (Cl. 56—238)

This invention relates to lawn mowers and more particularly to a cutting attachment for lawn mowers adapted to be used in cutting tall tough grass or weeds in advance of the usual cutting operation of a mower, both cutting operations being performed by a single movement of the mower.

Heretofore, the primary defect in the conventional lawn mower of the rotary blade or reel type has been due to the inability of the mower to cut long stemmed grass, weeds or the like, such tall growths being bent over or knocked down by the cutting reel without being brought between the blade and the ledger plate. Thus, when cutting tall grass and weeds, the mower only partly performs its function and leaves the lawn in an unsightly condition. Tall grass also tends to clog the driving mechanism for the cutting reel and impairs rapid cutting of the lawn. The field of utility of this type of mower is thus more or less limited to the cutting of relatively short grass. The same results occur to a lesser degree when the grass is relatively short except for certain growths, such as weeds, which have grown to a height approximately equal to the distance of the reel axis above the ground, these tall weeds or the like remaining uncut by the mower.

In my prior Patent No. 2,150,085, patented March 7, 1939, I have shown and described an attachment for lawn mowers which overcomes the above described defects by providing for the cutting of two swaths, one above the other, the first being at the proper level to cut the tall grass to a level low enough to permit the second to reduce all of the grass to the same height so as to leave the lawn in a neat and smooth condition after having been gone over only once by the mower.

The primary object of the present invention is to improve upon the construction of the attachment disclosed in my prior patent by providing a more compact unit, having fewer parts and which may be constructed more economically without sacrificing any of its efficiency.

A further object of the present invention is to provide an efficient cutting attachment which may be attached to any standard lawn mower whether it be power driven or manually operated and when used in connection with a manually operated mower, may be operated with a minimum expenditure of energy.

A still further object of the present invention is to provide a cutter attachment which is relatively simple in construction and which can be readily disassembled to permit cleaning.

Other objects and advantages reside in certain novel features of the construction, arrangement and combination of parts which will be hereinafter more fully described and particularly pointed out in the appended claims, reference being had to the accompanying drawings forming a part of this specification, and in which Figure 1 is a side elevation of the cutter attachment secured to the front cross bar of a standard lawn mower, only a portion of the mower being shown;

Figure 2 is a top or plan view of the attachment, only a portion of the lawn mower cross bar being shown;

Figure 3 is a front view of the supporting structure of the attachment taken on the line 3—3 of Figure 2;

Figure 4 is a vertical cross-sectional view of the drive mechanism taken on the line 4—4 of Figure 2;

Figure 5 is a similar view taken on the line 5—5 of Figure 4.

Referring to the drawings in detail wherein like reference numerals refer to like parts throughout the several views, the cutting attachment forming the subject matter of the present invention is shown mounted on the front spacing bar of a lawn mower. The lawn mower may be of standard construction and need not be specifically shown or described except in so far as it pertains to the present cutting attachment. For the purpose of the present description, only the front bar 1 and wheels 2, 2 of a standard mower are shown.

The cutting attachment consists of a frame member 3 having arms 4 and 5 rigidly secured thereto by means of bolts 6. A pair of shafts 7, 7 are rigidly mounted to the rear ends of arms 4 and 5 and have vertically inclined supporting bars 8, 8 pivotally mounted thereon and retained against separation by means of cotter pins 7a, 7a.

The vertical supporting bars 8, 8 are slightly longer than the arms 4 and 5 and terminate in curved portions 9, 9 for a purpose to be described. The supporting bars 8, 8 also include means for mounting the attachment to the cross bar 1. The bars are slotted as seen at 10, 10 through which threaded U-bolts 11, 11 extend. Plate members 12, 12 are provided as retaining means for the bolts. It is readily apparent that the construction of the attaching means is such as to permit ready attachment and detachment of the cutter and also provide for adjustment of the angular inclination of bars 8, 8 and vertical adjustment of arms 4 and 5. Thus it may be seen that the cutter may be used with any size lawn mower. It may in some instances, be desirable to use the cutter without the mower. When this is to be done, it would be a simple matter to provide a detachable handle arrangement to be connected to the supporting frame to drive the attachment.

Referring to Figures 4 and 5 in detail wherein is shown the driving mechanism for operating the cutter blade, the frame member 3 comprises an integrally cast housing member 13 having a spacing member 14 a part thereof. A bearing member 15 is centrally disposed within the housing member and is horizontally bored as seen at 16 to receive shaft member 17. The upper surface of member 15 is cut out as at 18 to receive the lower end 19 of vertical shaft 20. The upper part of spacer 14 is bored at 21 to permit the shaft 20 to pass therethrough.

The shaft 20 includes an integrally formed supporting member 22 having a flat upper surface on which the cutter blade 23 is rigidly mounted by means of screws 24. A threaded member 25 is mounted at the upper end of shaft 20 and although primarily intended for ornamental purposes, will function as an additional retaining means for blade 23 if screws 24 work loose.

A bevel pinion 26 surrounds shaft 20 adjacent its lower end within the housing member and is so mounted with respect to the shaft as to be rotatable therewith but may be removed to permit ready separation of the parts for the purpose of cleaning the unit. A loosely mounted spacing collar 27 is provided above the gear to space the gear from the spacer.

A pair of friction wheels 28 and 29 are secured to shaft 17 so as to lie closely adjacent the spacing member 14 and are so mounted as to be readily detachable from the shaft. To accomplish this end, wheel 28 has an integral hub portion 30 formed thereon through which a screw member 31 is threaded, the screw member cooperating with the shaft 17 to lock the wheel to the shaft. The wheel 29 also includes a hub portion 32 and a screw 33 for removably securing wheel 29 to the shaft 17. It is to be understood, however, that only one of the wheels need be removably secured to the shaft with the other wheel permanently attached to the shaft. This construction would permit separation of the parts for cleaning purposes.

The wheel 29 has a bevelled gear 34 integrally formed on its inner surface. The teeth of this gear are in mesh with the teeth of the pinion gear 26. In this respect it is to be noted that portion 15 is reduced on the side adjacent wheel 29 to accommodate the bevelled gear 34, as seen in Figure 5.

The wheels 29 and 30 have their outer circumferential edges rounded as at 35 to prevent destruction of the lawn grass. The outer circumferential surfaces of the wheels are suitably grooved to increase the bearing friction of the wheels.

From the foregoing description it will be seen that the cutting attachment forming the subject matter of the present invention is in the form of an attachment which may be connected to the mower or removed therefrom as desired. During the normal operation of the mower, wheels 28 and 29 rotate, thus rotating shaft 20 by means of the gear and pinion connection and causing blade 23 to rotate in a horizontal plane in advance of the mower reel. When both cutter and reel are operating, the assembly cuts two swaths, the cutting attachment effectively cutting the tall grass and weeds and the reel completing the work of trimming the lawn.

The present device is also constructed to permit the attachment to be swung into an inoperative position without removing the attachment from the mower. This may be necessary when approaching a fence or other obstruction and it is desired to complete the cutting of the grass with the mower reel alone. To attain this end, it is only necessary to pivot the attachment about shafts 7, 7 and rest arms 4 and 5 against the supporting bars 8, 8 thus supporting the attachment in an inoperative position as seen in dotted lines in Figure 1. The curved portions 9 act as a support for the cutter blade 23.

It is readily apparent that in order to obtain the maximum efficiency for the cutter attachment, the blade should rotate at a relatively high rate of speed. As pointed out in my prior patent referred to above, experimentation has shown that a rate of speed of twelve revolutions of the cutter blade for every revolution of the lawn mower wheels will produce maximum efficiency. In the present case the diameter of the small wheels is approximately one-third the diameter of the large wheels 2. The ratio of gears 34 and 26 is four to one. It will be obvious, therefore, that for every revolution of the mower wheels, the blade will rotate twelve times.

Thus it will be seen that the construction herein shown and described is well adapted to accomplish the objects of the present invention. It will be understood, however, that the invention may be embodied otherwise than here shown and that in the embodiments illustrated, certain changes in the construction may be made. Therefore, I do not wish to be limited precisely to the construction herein shown except as may be required by the appended claims considered with reference to the prior art.

Having thus described the invention, what is claimed is:

1. An attachment for lawn mowers comprising a supporting frame member, a horizontal shaft mounted in said frame member, a wheel mounted on said shaft, a bevelled gear on the inner surface of said wheel, a vertical shaft mounted on said frame member, a bevel pinion mounted on the vertical shaft cooperating with the bevelled gear to impart rotation to said vertical shaft, and a cutter blade mounted on the upper end of said vertical shaft, said wheel being movable along the ground to impart rotation to the cutter blade, said cutter blade being rotatable above the plane of the horizontal shaft.

2. An attachment for lawn mowers comprising a supporting frame member, a horizontal shaft mounted in said frame member, a wheel mounted on said shaft, a vertical shaft mounted on said frame member, means on said wheel cooperating with said vertical shaft to cause rotation thereof, means cooperating with said wheel to substantially enclose said shaft rotating means, a cutter blade mounted at the upper end of the vertical shaft, said wheel being movable along the ground to impart rotation to the cutter blade, said cutter blade being rotatable above the plane of the horizontal shaft.

3. An attachment for a lawn mower comprising supporting means, a horizontal shaft mounted on said means, a pair of wheels mounted on said shaft, said wheels and supporting means forming an enclosed housing, a vertical shaft mounted in said housing and having its upper end projecting through the housing, a cutter blade mounted at the upper end of the vertical shaft and lying in a single plane above the wheels, and means within the housing operated by rotation of the wheels to rotate the cutter blade.

4. An attachment for lawn mowers comprising a supporting frame, a horizontal shaft mounted on said frame, a pair of wheels mounted on said shaft, said wheels and supporting frame forming a substantially enclosed casing, a vertical shaft passing through an opening in said casing and having a cutter blade mounted at its upper end and lying in a single plane above the wheels, and means on the inner surface of one of said wheels cooperating with the vertical shaft for imparting rotation thereto.

5. An attachment for a lawn mower provided with a horizontal cross bar comprising a vertically inclined supporting bar clamped to said cross bar, the upper end of said inclined bar extending rearwardly of the cross bar, a supporting frame pivotally connected to the lower end of the inclined bar, a horizontally operating cutter blade mounted at the front end of the supporting frame, means mounted on the supporting frame for operating said cutter blade in advance of the lawn mower, said supporting frame adapted to be swung about its pivot to rest on the vertically inclined bar.

6. An attachment for a lawn mower provided with a horizontal cross bar comprising a pair of vertically inclined supporting bars clamped to said cross bar, the upper ends of said inclined bars extending rearwardly of the cross bar and having rearwardly extending extensions, a supporting frame pivotally connected to the lower ends of the inclined bars, a horizontally operating cutter blade mounted at the front end of the supporting frame, means mounted on the supporting frame for operating said cutter blade in advance of the lawn mower, said supporting frame adapted to be swung about its pivotal connections to rest on the vertically inclined bars, the extensions functioning as a support for the cutter blade.

CLAUDE O. TODD.